US010168984B2

(12) United States Patent
Tang et al.

(10) Patent No.: US 10,168,984 B2
(45) Date of Patent: Jan. 1, 2019

(54) IMAGE RECEIVING APPARATUS AND METHOD THEREOF FOR DETERMINING AN ORIENTATION OF A SCREEN OF AN ELECTRONIC APPARATUS

(71) Applicant: AutoChips Inc., Hefei, Anhui Province (CN)

(72) Inventors: Jing Tang, Hefei (CN); Wenjun Wang, Hefei (CN)

(73) Assignee: AUTOCHIPS INC., Hefei, Anhui Province (CN)

( * ) Notice: Subject to any disclaimer, the term of this patent is extended or adjusted under 35 U.S.C. 154(b) by 111 days.

(21) Appl. No.: 14/953,346

(22) Filed: Nov. 28, 2015

(65) Prior Publication Data

US 2016/0188282 A1  Jun. 30, 2016

(30) Foreign Application Priority Data

Dec. 29, 2014 (CN) .......................... 2014 1 0849412

(51) Int. Cl.
| | |
|---|---|
| *G06F 3/14* | (2006.01) |
| *G06T 7/00* | (2017.01) |
| *G06T 7/60* | (2017.01) |
| *G09G 5/12* | (2006.01) |
| *G09G 5/32* | (2006.01) |
| *G06T 7/70* | (2017.01) |

(52) U.S. Cl.
CPC .............. *G06F 3/1462* (2013.01); *G06T 7/70* (2017.01); *G09G 5/12* (2013.01); *G09G 5/32* (2013.01); *G06T 2207/10024* (2013.01); *G09G 2320/068* (2013.01); *G09G 2340/0471* (2013.01); *G09G 2340/0478* (2013.01); *G09G 2356/00* (2013.01)

(58) Field of Classification Search
USPC ........................................ 382/289, 162–180
See application file for complete search history.

(56) References Cited

U.S. PATENT DOCUMENTS

| | | | | |
|---|---|---|---|---|
| 5,592,572 A | * | 1/1997 | Le ......................... | G06K 9/3283 382/171 |
| 6,618,494 B1 | * | 9/2003 | Nonay .................. | G06T 3/0081 378/207 |
| 2007/0206877 A1 | * | 9/2007 | Wu ....................... | G06K 9/3283 382/275 |
| 2010/0118342 A1 | * | 5/2010 | Takio ................. | H04N 1/00347 358/1.15 |

FOREIGN PATENT DOCUMENTS

| | | |
|---|---|---|
| CN | 103645842 A | 3/2014 |
| CN | 104156506 A | 11/2014 |

\* cited by examiner

*Primary Examiner* — Jennifer Mehmood
*Assistant Examiner* — Deeprose Subedi
(74) *Attorney, Agent, or Firm* — Cheng-Ju Chiang (57) ABSTRACT

A method for determining an orientation of a screen of an electronic apparatus and an image receiving apparatus are provided. The method for determining the screen orientation includes the following steps of: receiving a screen shared image transmitted by the electronic apparatus, the screen shared image is a color image; performing line sampling on pixels of the screen shared image; and determining whether the screen is in the landscape orientation or in the portrait orientation according to color values of the sampled pixels of the screen shared image. The present disclosure can determine the screen orientation according to color values of the sampled pixels with small amount of operation data and high accuracy.

16 Claims, 4 Drawing Sheets

IMAGE RECEIVING APPARATUS AND METHOD THEREOF FOR DETERMINING AN ORIENTATION OF A SCREEN OF AN ELECTRONIC APPARATUS

FIELD OF THE INVENTION

The present disclosure generally relates to the technical field of synchronous data transmission, and more particularly, to an image receiving apparatus and a method for determining an orientation of a screen of an electronic apparatus.

BACKGROUND OF THE INVENTION

It is expected to map what displayed on a screen of a handheld terminal to a screen of a vehicle-mounted terminal, such that the driver can send a control instruction to the handheld terminal by touching the screen of the vehicle-mounted terminal, so as to synchronously manipulate the handheld terminal. To achieve this purpose, the vehicle-mounted terminal must know the orientation of the screen of the handheld terminal before synchronous manipulation. Otherwise, it is very likely that the touch coordinate would shift during the process of synchronous manipulation, which would greatly affect the effect of the synchronous manipulation.

In the related art, whether the screen is in a landscape orientation or in a portrait orientation is usually determined by calculating an average grayscale value of a screen shared image. However, in order to calculate the average grayscale value of the screen shared image, it is necessary to have prior knowledge of the mapping region onto which the screen of the handheld terminal is mapped on the screen of the vehicle-mounted terminal and it is necessary to calculate the average grayscale value of the whole non-mapping region. Therefore, the operation data amount is huge, and particularly when a night-scene image is displayed, the average grayscale value of the image itself is relatively low but brightness of the background color in the non-mapping region is relatively high, so accuracy of the identification result cannot be ensured.

SUMMARY OF THE INVENTION

Embodiments of the present disclosure provide an image receiving apparatus and a method thereof for determining an orientation of a screen of an electronic apparatus, which can accurately determine the screen orientation with a small amount of operation data.

An embodiment of the present disclosure provides a method for determining an orientation of a screen of an electronic apparatus, which comprises the following steps of: receiving a screen shared image transmitted by the electronic apparatus, the screen shared image is a color image; performing line sampling on pixels of the screen shared image; and determining whether the screen is in a landscape orientation or in a portrait orientation according to color values of the sampled pixels of the screen shared image.

Another embodiment of the present disclosure provides an image receiving apparatus, which comprises a communication module, a memory and a processor. The communication module is configured to receive a screen shared image transmitted by an electronic apparatus and temporarily store the screen shared image into the memory. The processor is configured to perform line sampling on pixels of the screen shared image and determine whether the screen is in a landscape orientation or in a portrait orientation according to color values of the sampled pixels.

According to the image receiving apparatus and the method thereof for determining an orientation of a screen of an electronic apparatus, the orientation of the screen can be determined simply by performing line sampling on the pixels of the screen shared image and obtaining the color values of the line sampled pixels. Thereby, it is unnecessary to sample both regions inside and outside the whole screen shared image, so the operation data amount is small; and because the brightness inside and outside the screen shared image need not be considered when the color values of the line sampled pixels are utilized, accuracy of the determination result of the screen orientation can be improved.

DETAILED DESCRIPTION OF THE INVENTION

Hereinbelow, technical solutions of embodiments of the present disclosure will be described clearly and completely with reference to the attached drawings. Obviously, embodiments described hereinbelow are only some of but not all of the embodiments of the present disclosure. All other embodiments that can be obtained without making any inventive efforts by those of the ordinary skilled in the art upon reviewing the embodiments of the present disclosure shall fall within the scope of the present disclosure.

Figure 1:
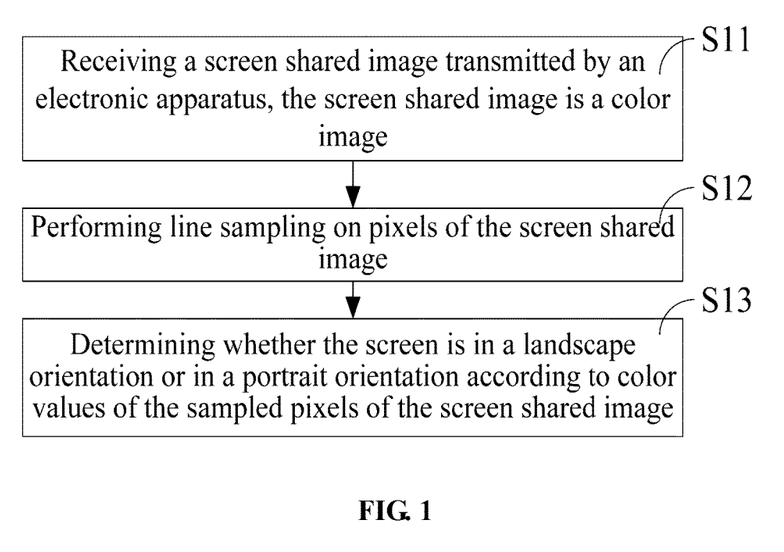
FIG. 1 is a flowchart diagram of a method for determining a screen orientation according to an embodiment of the present disclosure.

FIG. 1 illustrates a method for determining a screen orientation according to an embodiment of the present disclosure. The method determines whether the screen of an electronic apparatus is in a landscape orientation or a portrait orientation by creating a data transmission connection between the electronic apparatus and an image receiving apparatus. The connection between the electronic apparatus and the image receiving apparatus may be created based on the Bluetooth HID (The Human Interface Device) protocol, and the present disclosure makes no limitation on the interface type of the data transmission for connecting the electronic apparatus and the image receiving apparatus. Furthermore, the connection may also be a short-range wireless communication connection (e.g., by means of the infrared rays, the Bluetooth, the WiFi or the like), and may further be a long-range communication connection, e.g., a mobile communication connection based on 2G (2rd-Generation, the second generation mobile communication technique), 3G (3rd-Generation, the third generation mobile communication technique) and/or 4G (4rd-Generation, the fourth generation communication technique) or the like.

In the embodiments of the present disclosure, a smart phone is described as an example of the electronic apparatus, and a vehicle-mounted terminal is described as an example of the image receiving apparatus throughout the specification. Of course, they are not limited thereto, and they may be any two terminals with a function of screen synchronous transmission, for example, a PDA (Personal Digital Assistant, i.e., a personal digital assistant or a tablet computer), a portable communication apparatus, a slideshow device, a smart wristband, smart glasses, and a wearable device embedded in clothes or the like.

As shown in FIG. 1, the method for determining the screen orientation according to this embodiment comprises the following steps.

In step S11, the image receiving apparatus receives a screen shared image transmitted by the electronic apparatus, the screen shared image is a color image.

Figure 2:
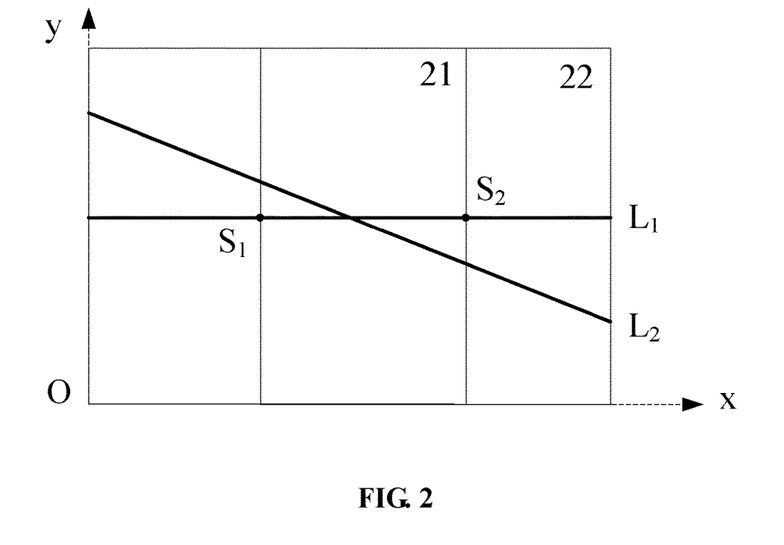
FIG. 2 is a schematic view illustrating a scenario where the screen is in a landscape orientation according to the embodiment of the present disclosure.
Figure 3:
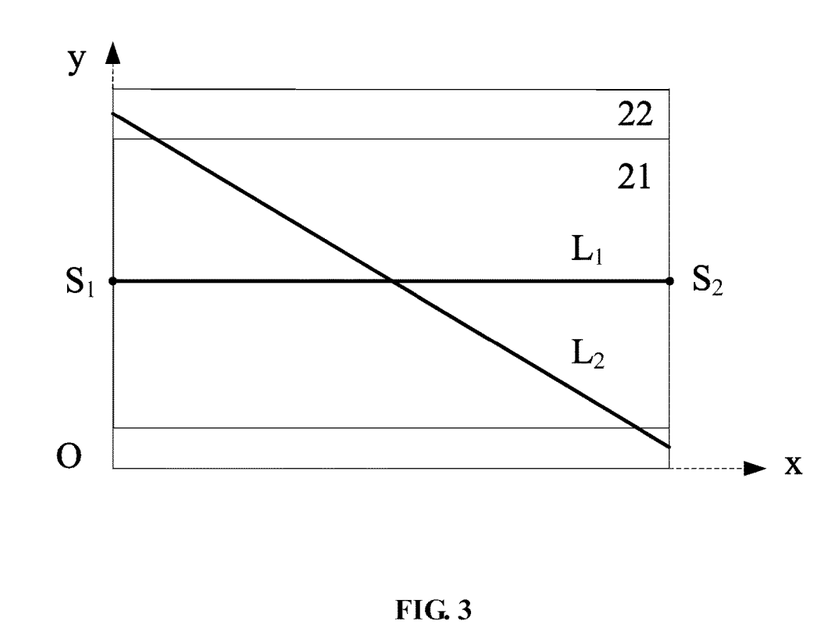
FIG. 3 is a schematic view illustrating a scenario where the screen is in a portrait orientation according to the embodiment of the present disclosure.

FIG. 2 and FIG. 3 are schematic views respectively illustrating a scenario where the screen is in the landscape orientation and a scenario where the screen is in the portrait orientation according to an embodiment of the present disclosure. Referring to both FIG. 2 and FIG. 3, after a connection is created between the electronic apparatus and the image receiving apparatus, what displayed on the screen 21 of the electronic apparatus is mapped onto the screen 22 of the image receiving apparatus. The display image on the screen 21 is the screen shared image, and the screen shared image may be a static picture and may also be a dynamic picture corresponding to a video file.

Further, a user may synchronously manipulate the display image on the screen 21 of the electronic apparatus through manipulating the image receiving apparatus, such as clicking the touch display screen 22 of the image receiving apparatus.

In step S12, the image receiving apparatus performs line sampling on pixels of the screen shared image.

The straight line for performing line sampling must run through the screen shared image displayed on the screen 22 of the image receiving apparatus, and both ends of the straight line connect two long edges of the screen 22 of the image receiving apparatus, that is, the straight line runs through a mapping region and a non-mapping region of the screen 22 of the image receiving apparatus.

There may be one or more straight lines for performing line sampling. The straight line(s) may be parallel to the length direction of the screen 22 of the image receiving apparatus (e.g., the straight line L1), and may also intersect with the length direction of the screen 22 (e.g., the straight line L2). Additionally, the straight line(s) for performing line sampling may also be parallel to the width direction of the screen 22 of the image receiving apparatus.

In step S13, the image receiving apparatus determines whether the screen is in a landscape orientation mode or in a portrait orientation mode according to color values of the sampled pixels of the screen shared image.

Because each straight line runs through the mapping region corresponding to the screen shared image and the non-mapping region outside the screen shared image, and color values of the pixels in the two regions are different, for example, the color values of the pixels in the mapping region are random values greater than 16 and vary with images, while the color values of the pixels in the non-mapping region are 16, boundary points (a start point and an end point) of the screen shared image on the straight line thus can be obtained by comparing the color values of different pixels, so as to further obtain a width-to-height ratio of the screen shared image. Thus, whether the screen 21 of the electronic apparatus is in the landscape orientation or in the portrait orientation can be determined. Whereby, it is unnecessary to sample the regions both inside and outside the whole screen shared image, so the operation data amount is small; and because the brightness inside and outside the screen shared image need not be considered when the color values of the line sampled pixels are utilized, accuracy of the determination result of the screen orientation can be improved.

In practical application, the whole display image on the screen 21 of the electronic apparatus is mapped onto the screen 22 of the image receiving apparatus to form the screen shared image, and when displaying, the screen 21 of the electronic apparatus comprises both an effective image region corresponding to an image actually displayed by the screen 21 and a peripheral region outside the effective image region. Correspondingly, the screen shared image also comprises an effective image region and a peripheral region. Because the peripheral region and the non-mapping region displayed by the screen 22 of the image receiving apparatus are both of a black color, that is, the color values of the pixels in the peripheral region and the non-mapping region are identical, the embodiment of the present disclosure may determine the effective image region in the screen shared image according to the color values of the sampled pixels, so that whether the screen 21 of the electronic apparatus is in the landscape orientation or in the portrait orientation may be determined according to the effective image region.

Hereinafter, an embodiment of the present disclosure in which whether the screen 21 of the electronic apparatus is in the landscape orientation or in the portrait orientation is determined according to the effective image region will be described.

Figure 4:
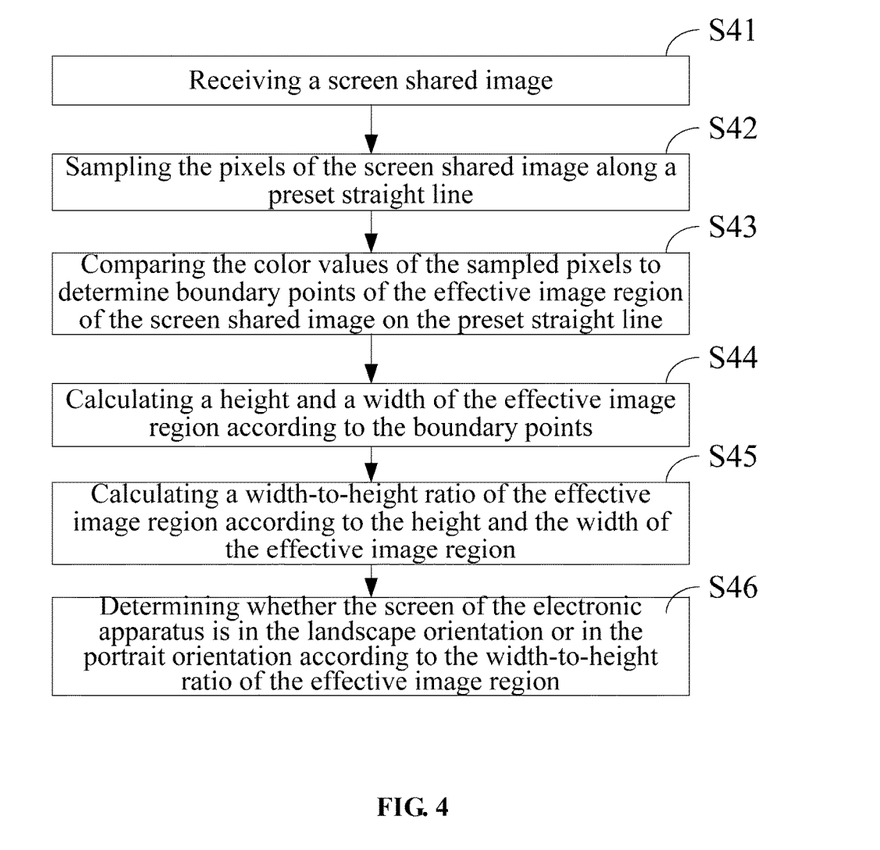
FIG. 4 is a flowchart diagram of a method for determining the screen orientation according to another embodiment of the present disclosure.

FIG. 4 is a flowchart diagram of a method for determining a screen orientation according to another embodiment of the present disclosure. Based on the embodiment illustrated in FIG. 1, this embodiment will describe the process of determining the screen orientation in detail.

As shown in FIG. 4, the method for determining the screen orientation in this embodiment comprises the following steps.

In step S41, the image receiving apparatus receives a screen shared image transmitted by the electronic apparatus, the screen shared image is a color image.

In step S42, the image receiving apparatus samples the pixels of the screen shared image along a preset straight line.

In step S43, the image receiving apparatus compares the color values of the sampled pixels to determine boundary points of the effective image region of the screen shared image on the preset straight line.

Referring back to FIG. 2 and FIG. 3, the preset straight line L1 for sampling is substantially parallel to the length direction of the screen 22 of the image receiving apparatus, and the pixels on the preset straight line L1 are the sampled pixels.

The ways to determine the boundary points of the effective image region on the preset straight line L1 in this embodiment include but are not limited to the following three ways.

The first way is to sequentially compare the color value of each of the sampled pixels with a preset reference color value along an extension direction of the preset straight line L1 or along a direction from both ends of the preset straight line L1 towards the effective image region. If the color value of the sampled pixel is smaller than or equal to the preset reference color value, then it is determined that the sampling point of the sampled pixel is outside the effective image region; and if the color value of the sampled pixel is greater than the preset reference color value, then it is determined that the sampling point of the sampled pixel is within the effective image region.

The color values of the sampled pixels of the screen shared image are RGB. For example, suppose that the preset reference color value is RGB (16, 16, 16). If the color value of the current sampled pixel is RGB (13, 13, 13), then it is determined that the sampling point of the sampled pixel is outside the effective image region; and if the color value of the current sampled pixel is RGB (128, 128, 128), then it is determined that the sampling point of the sampled pixel is within the effective image region.

The second way is to sequentially compare the color value of each of the sampled pixels with a preset reference color value along a direction from a mid-point of the preset straight line L1 towards both ends of the preset straight line L1. If the color value of the sampled pixel is smaller than or equal to the preset reference color value, then it is determined that the sampling point of the sampled pixel is outside the effective image region; and if the color value of the sampled pixel is greater than the preset reference color value, then it is determined that the sampling point of the sampled pixel is within the effective image region.

The aforesaid method of determining the boundary points can directly determine the screen orientation according to the coordinates of the boundary points. For example, suppose that the preset straight line for performing line sampling is a horizontal line. Then, if the abscissa coordinates of the boundary points are within a preset range, then it is determined that the screen of the electronic apparatus is in the landscape orientation; and otherwise, it is determined that the screen of the electronic apparatus is in the portrait orientation. As another example, suppose that the preset straight line for performing line sampling is a vertical line. Then, if the ordinate coordinates of the boundary points are within a preset range, it is determined that the screen of the electronic apparatus is in the portrait orientation; and otherwise, it is determined that the screen of the electronic apparatus is in the landscape orientation. The preset range described above may be determined according to experiences.

The third way is to sequentially compare the color values of the sampled pixels at different sampling positions on the preset straight line L1 along the extension direction of the preset straight line L1 or along the direction from both ends of the preset straight line L1 towards the effective image region. If the color values of the sampled pixels at adjacent sampling positions are identical to each other, it is determined that the sampling points of the sampled pixels are outside the effective image region; and if the current sampled pixel has a different pixel value from the afore compared sampled pixels, it is determined that the sampling point of the current sampled pixel is within the effective image region.

In step S44, the image receiving apparatus calculates a height and a width of the effective image region according to the boundary points.

Usually the orientation of the electronic screen can be determined according to one of the boundary points. However, in some particular cases, a distance between the boundary points of the effective image region and the screen boundary can be further decided according to the coordinates of two boundary points on the preset straight line, so as to avoid misjudgment in some extreme cases. For example, in a case where the received screen shared image is of a pure color or a certain part (e.g., a left/right half or an upper/lower half) thereof is of a pure black color, misjudgment may occur. The present disclosure further calculates coordinate differences between the two boundary points and the screen boundary, and chooses the boundary point having a smaller coordinate difference from the screen boundary as the correct boundary point, and with reference to a central axis of the screen, revises the other boundary point into a point that is symmetric with this correct boundary point. In the above case, the distances between both ends of the screen shared image and the screen boundary can be obtained accurately, so as to further accurately calculate the height and the width of the effective image region and the size of the ineffective image region.

As shown in FIG. 2 and FIG. 3, by creating a rectangular plane coordinate system which takes an vertex O of the screen 22 of the image receiving apparatus as an origin and takes two edges perpendicular to each other and corresponding to the vertex O as an abscissa x-axis and an ordinate y-axis respectively, the coordinates of the boundary points S1 and S2 on the screen 22 of the image receiving apparatus can be obtained so that the height and the width of the effective image region can be calculated.

Calculating the height and the width of the effective image region according to the coordinates of the boundary points may be, for example, to calculate the distances from the boundary points to the two sides of the screen or to the upper and the lower boundaries of the screen according to the coordinates of the boundary points. In practice, calculating the height and the width of the effective image region and determining the screen orientation may be accomplished according to the coordinate of only one boundary point at one side or according to the boundary points at both sides.

There are a plurality of ways to calculate the height and the width of the effective image region according to the coordinates of the boundary points, and how to calculate the distances between the boundary points and the two sides or the upper and lower boundaries of the screen according to the coordinates in the rectangular plane coordinate system is known to people skilled in the art, so this will not be further detailed herein.

In step S45, the image receiving apparatus calculates a width-to-height ratio of the effective image region according to the height and the width of the effective image region.

In step S46, the image receiving apparatus determines whether the screen of the electronic apparatus is in the landscape orientation or in the portrait orientation according to the width-to-height ratio of the effective image region.

If the width-to-height ratio of the effective image region is smaller than 1, then it is determined that the screen 21 of the electronic apparatus is in the portrait orientation; and if the width-to-height ratio of the effective image region is greater than 1, then it is determined that the screen 21 of the electronic apparatus is in the landscape orientation.

In practical applications, the screen 21 of the electronic apparatus in the landscape orientation usually does not display the peripheral region outside the effective image region. Therefore, on the basis of the embodiment illustrated in FIG. 4, the embodiment of the present disclosure further determines whether the boundary points S1 and S2 of the effective image region along the width direction are located at the edge of the screen shared image prior to the step S44 of calculating the height and the width of the effective image region according to the boundary points S1 and S2. Additionally, in another embodiment, instead of calculating the height and the width of the effective image region, it is directly determined whether the boundary points S1 and S2 of the effective image region on the preset straight sampling line along the width direction of the screen 22 are located at the edge of the screen shared image in order to determine whether the screen 21 of the electronic apparatus is in the landscape orientation mode; or it is directly determined whether the boundary points S1 and S2 of the effective image region on the preset straight sampling line along the length direction of the screen 22 are located at an edge of the screen shared image in order to determine whether the screen 21 of the electronic apparatus is in the portrait orientation.

As shown in FIG. 3, if the boundary points S1 and S2 of the effective image region along the width direction of the screen 22 are located at the edge of the screen shared image, it is determined that the screen 21 of the electronic apparatus is in the landscape orientation; and if the boundary points S1 and S2 of the effective image region along the length direction of the screen 22 are located at the edge of the screen shared image, it is determined that the screen 21 of the electronic apparatus is in the portrait orientation.

In another embodiment of the present disclosure, the height and the width of the effective image region may be respectively calculated according to boundary points of a plurality of straight lines that are line sampled. For example, a plurality of line samplings parallel to the length direction of the screen of the image receiving apparatus and a plurality of line samplings parallel to the width direction of the screen of the image receiving apparatus may be performed on pixels of the screen shared image to calculate the height and the width of the effective image region according to a plurality of boundary points. There are a plurality of variants for obtaining the boundary points and calculating the height and the width of the effective image region by use of the coordinates of the boundary points according to the present disclosure, and how to accomplish them is well known to people skilled in the art upon reviewing this specification, so it will not be further detailed herein.

Figure 5:
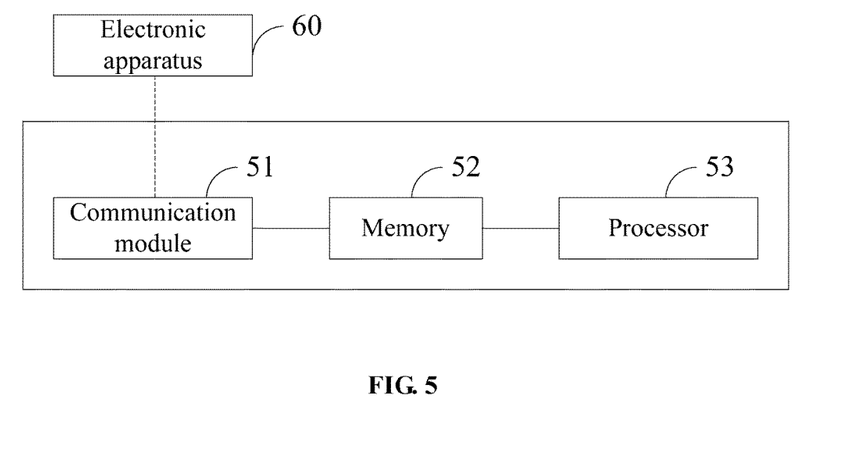
FIG. 5 is a schematic structural view of an image receiving apparatus according to an embodiment of the present disclosure.

FIG. 5 is a schematic structural view of an image receiving apparatus of an embodiment of the present disclosure. As shown in FIG. 5, the image receiving apparatus 50 comprises a communication module 51, a memory 52 and a processor 53.

The communication module 51 receives a screen shared image transmitted by an electronic apparatus 60 and temporarily stores the screen shared image into the memory 52. The processor 53 performs line sampling on pixels of the screen shared image and determines whether the screen of the electronic apparatus 60 is in a landscape orientation or in a portrait orientation according to color values of the sampled pixels.

In practical applications, the screen shared image comprises both an effective image region corresponding to an image actually displayed on the screen of the electronic apparatus 60 and a peripheral region located outside the effective image region, and color values of pixels of the peripheral region and color values of pixels of the non-mapping region displayed on the screen of the image receiving apparatus 50 are identical to each other, so the processor 50 of this embodiment can determine the effective image region in the screen shared image according to the color values of the sampled pixels and then determine whether the screen 21 of the electronic apparatus 60 is in the landscape orientation or in the portrait orientation according to the effective image region.

The processor 53 samples the pixels of the screen shared image along a preset straight line, and compares the color values of the sampled pixels to determine boundary points of the effective image region on the preset straight line.

In this embodiment, the ways for the processor 53 to determine the boundary points of the effective image region of the screen shared image that are located on the preset straight line comprise but are not limited to the following three ways.

For the first way, the processor 53 sequentially compares the color value of each of the sampled pixels with a preset reference color value. If the color value of the sampled pixel is not greater than the preset reference color value, the processor 53 determines that the sampling point of the sampled pixel is outside the effective image region; and if the color value of the sampled pixel is greater than the preset reference color value, the processor 53 determines that the sampling point of the sampled pixel is within the effective image region.

For the second way, the processor 53 sequentially compares the color value of each of the sampled pixels with a preset reference color value along a direction from a midpoint of the preset straight line towards both ends of the preset straight line. If the color value of the sampled pixel is smaller than or equal to the preset reference color value, the processor 53 determines that the sampling point of the sampled pixel is outside the effective image region; and if the color value of the sampled pixel is greater than the preset reference color value, the processor 53 determines that the sampling point of the sampled pixel is within the effective image region.

The aforesaid method of determining the boundary points can directly determine the screen orientation according to the coordinates of the boundary points. For example, suppose that the preset straight line for performing line sampling is a horizontal line. Then, if the abscissa coordinates of the boundary points are within a preset range, it is determined that the screen of the electronic apparatus is in the landscape orientation; and otherwise, it is determined that the screen of the electronic apparatus is in the portrait orientation. As another example, suppose that the preset straight line for performing line sampling is a vertical line. Then, if the ordinate coordinates of the boundary points are within a preset range, it is determined that the screen of the electronic apparatus is in the portrait orientation; and otherwise, it is determined that the screen of the electronic apparatus is in the landscape orientation. The preset range described above may be determined according to experiences.

For the third way, the processor 53 sequentially compares the color values of the sampled pixels at different sampling positions on the preset straight line. If the color values of the sampled pixels at adjacent sampling positions are identical to each other, the processor 53 determines that the sampling points of the sampled pixels are outside the effective image region; and if the current sampled pixel has a different pixel value from the afore compared sampled pixels, the processor 53 determines that the sampling point of the current sampled pixel is within the effective image region.

After determining the boundary points of the effective image region on the preset straight line, the processor 53 calculates a height and a width of the effective image region according to the boundary points. The way to calculate the height and the width of the effective image region according to the boundary points are as described previously, so it will not be further detailed herein.

Further, the processor 53 calculates a width-to-height ratio of the effective image region according to the height and the width of the effective image region, and determines whether the screen of the electronic apparatus 60 is in the landscape orientation or in the portrait orientation according to the width-to-height ratio of the effective image region. Specifically, the processor 53 determines that the screen of the electronic apparatus 60 is in the portrait orientation if the width-to-height ratio of the effective image region is calculated to be smaller than 1, and determines that the screen of the electronic apparatus 60 is in the landscape orientation if the width-to-height ratio of the effective image region is calculated to be greater than 1.

In practical applications, usually the peripheral region outside the effective image region is not displayed when the screen of the electronic apparatus 60 is in the landscape orientation, so the processor 53 is further configured to, before calculating the height and the width of the effective image region according to the boundary points, determine whether boundary points of the effective image region along the width direction are located at an edge of the screen shared image. If the boundary points of the effective image region along the width direction of the screen of the image receiving apparatus are located at an edge of the screen shared image, the processor 53 determines that the screen of the electronic apparatus 60 is in the landscape orientation; and if the boundary points of the effective image region along the length direction of the screen of the image receiving apparatus are located at an edge of the screen shared image, the processor 53 determines that the screen of the electronic apparatus 60 is in the portrait orientation. Additionally, in another embodiment, instead of calculating the height and the width of the effective image region, the processor 53 directly determines whether the boundary points of the effective image region along the width direction are located at an edge of the screen shared image so as to determine whether the screen of the electronic apparatus is in the landscape orientation; or the processor 53 directly determines whether the boundary points of the effective image region along the length direction of the screen of the image receiving apparatus are located at an edge of the screen shared image so as to determine whether the electronic apparatus is in the portrait orientation.

The structural elements of the image receiving apparatus 50 of this embodiment can correspondingly perform methods for determining the screen orientation in any of the embodiments described above, so this embodiment has the same technical effects as the embodiments described above. Furthermore, connections between the structural elements of the image receiving image 50 described above can be achieved in the form of interfaces, in an electrical form or in other forms.

It shall also be noted that, what described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method for determining an orientation of a screen of an electronic apparatus, comprising the following steps of:
    receiving a screen shared image transmitted by the electronic apparatus, wherein the screen shared image is a color image;
    performing line sampling on pixels of the screen shared image; and
    determining whether the screen is in a landscape orientation or in a portrait orientation according to color values of the sampled pixels of the screen shared image;
    wherein the step of determining wherein the screen is in the landscape orientation or in the portrait orientation according to color values of the sampled pixels of the screen shared image, further comprises the following steps of:
    determining an effective image region in the screen shared image according to the color values of the sampled pixels, wherein the screen shared image comprises the effective image region and a peripheral region outside the effective image region, the effective image region corresponds to an image actually displayed by the screen of the electronic apparatus; and
    determining whether the screen of the electronic apparatus is in the landscape orientation or in the portrait orientation according to the effective image region;
    wherein the step of performing line sampling on pixels of the screen shared image comprises: sampling the pixels of the screen shared image along a preset straight line, wherein the preset straight line runs through the effective image region and the peripheral region outside the effective image region; and
    the step of determining the effective image region comprises: comparing the color values of the sampled pixels of the screen shared image to determine boundary points of the effective image region on the preset straight line.

2. The method of claim 1, wherein the step of determining the effective image region in the screen shared image according to the color values of the sampled pixels comprises the following steps of:
    sequentially comparing the color value of each of the sampled pixels with a preset reference color value; and
    when the color value of the sampled pixel is not greater than the preset reference color value, determining that the sampling point of the sampled pixel is outside the effective image region; and
    when the color value of the sampled pixel is greater than the preset reference color value, determining that the sampling point of the sampled pixel is within the effective image region.

3. The method of claim 1, wherein the step of comparing the color values of the sampled pixels of the screen shared image comprises the following steps of:
    sequentially comparing the color values of the sampled pixels of the screen shared image at different sampling positions on the preset straight line;
    when the color values of the sampled pixels of the screen shared image at adjacent sampling positions are identical to each other, determining that the sampling points of the sampled pixels are outside the effective image region; and
    when the current sampled pixel has a different pixel value from the afore compared sampled pixels, determining that the sampling point of the current sampled pixel is within the effective image region.

4. The method of claim 1, wherein the step of comparing the color values of the sampled pixels of the screen shared image comprises the following steps of:
    sequentially comparing the color value of each of the sampled pixels with a preset reference color value along a direction from a mid-point of the preset straight line towards both ends of the preset straight line;

when the color value of the sampled pixel is not greater than the preset reference color value, determining that the sampling point of the sampled pixel is outside the effective image region; and when the color value of the sampled pixel is greater than the preset reference color value, determining that the sampling point of the sampled pixel is within the effective image region.

5. The method of claim 1, wherein the step of determining whether the screen of the electronic apparatus is in the landscape orientation or in the portrait orientation according to the effective image region comprises the following steps of:

calculating a height and a width of the effective image region according to the boundary points;

calculating a width-to-height ratio of the effective image region according to the height and the width of the effective image region; and determining whether the screen of the electronic apparatus is in the landscape orientation or in the portrait orientation according to the width-to-height ratio of the effective image region.

6. The method of claim 5, wherein the step of determining whether the screen of the electronic apparatus is in the landscape orientation or in the portrait orientation according to the width-to-height ratio of the effective image region comprises the following steps of:

when the width-to-height ratio of the effective image region is smaller than 1, determining that the screen of the electronic apparatus is in the portrait orientation; and when the width-to-height ratio of the effective image region is greater than 1, determining that the screen of the electronic apparatus is in the landscape orientation.

7. The method of claim 1, wherein the step of determining whether the screen of the electronic apparatus is in the landscape orientation or in the portrait orientation according to the effective image region comprises the following steps of:

when boundary points of the effective image region along the width direction are located at an edge of the screen shared image, determining that the screen of the electronic apparatus is in the landscape orientation; and when boundary points of the effective image region along the length direction are located at an edge of the screen shared image, determining that the screen of the electronic apparatus is in the portrait orientation.

8. An image receiving apparatus, comprising:

a communication module, configured to receive a screen shared image transmitted by an electronic apparatus;

a memory, configured to temporarily stores the screen shared image, wherein the screen shared image is a color image; and a processor, configured to perform line sampling on pixels of the screen shared image and determine whether the screen is in a landscape orientation or in a portrait orientation according to color values of the sampled pixels of the screen shared image;

wherein the processor is further configured to determine an effective image region in the screen shared image according to the color values of the sampled pixels, the screen shared image comprises the effective image region and a peripheral region outside the effective image region, the effective image region corresponds to an image actually displayed on the screen of the electronic apparatus, and the processor is further configured to determine whether the screen of the electronic apparatus is in the landscape orientation or in the portrait orientation according to the effective image region;

wherein the processor is further configured to sample the pixels of the screen shared image along a preset straight line, and compare the color values of the sampled pixels to determine boundary points of the effective image region on the preset straight line, and the preset straight line runs through the effective image region and the peripheral region outside the effective image region.

9. The image receiving apparatus of claim 8, wherein the processor is further configured to sequentially compare the color value of each of the sampled pixels with a preset reference color value, and is configured to determine the sampling point of the sampled pixel is outside the effective image region when the color value of the sampled pixel is not greater than the preset reference color value, and determine the sampling point of the sampled pixel is within the effective image region when the color value of the sampled pixel is greater than the preset reference color value.

10. The image receiving apparatus of claim 8, wherein the processor is further configured to sequentially compare the color values of the sampled pixels of the screen shared image at different sampling positions on the preset straight line, and is configured to determine the sampling points of the sampled pixels are outside the effective image region when the color values of the sampled pixels of the screen shared image at adjacent sampling positions are identical to each other, and determine the sampling point of the current sampled pixel is within the effective image region when the current sampled pixel has a different pixel value from the afore compared sampled pixels.

11. The image receiving apparatus of claim 8, wherein the processor is further configured to sequentially compare the color value of each of the sampled pixels with a preset reference color value along a direction from a mid-point of the preset straight line towards both ends of the preset straight line, and is configured to determine the sampling point of the sampled pixel is outside the effective image region when the color value of the sampled pixel is not greater than the preset reference color value, and determine the sampling point of the sampled pixel is within the effective image region when the color value of the sampled pixel is greater than the preset reference color value.

12. The image receiving apparatus of claim 8, wherein the processor is further configured to calculate a height and a width of the effective image region according to the boundary points, calculate a width-to-height ratio of the effective image region according to the height and the width of the effective image region, and determine whether the screen of the electronic apparatus is in the landscape orientation or in the portrait orientation according to the width-to-height ratio of the effective image region.

13. The image receiving apparatus of claim 12, wherein the processor is further configured to determine the screen of the electronic apparatus is in the portrait orientation when the width-to-height ratio of the effective image region is smaller than 1, and determine the screen of the electronic apparatus is in the landscape orientation when the width-to-height ratio of the effective image region is greater than 1.

14. The image receiving apparatus of claim 8, wherein the processor is further configured to determine whether boundary points of the effective image region along the width direction are located at an edge of the screen shared image, wherein when the boundary points along the width direction of the effective image region are located at the edge of the screen shared image, it is determined that the screen of the electronic apparatus is in the landscape orientation, and determine whether boundary points of the effective image region along the length direction are located at an edge of the screen shared image, wherein when the boundary points along the length direction of the effective image region are located at the edge of the screen shared image, determine that the screen of the electronic apparatus is in the portrait orientation.

15. The image receiving apparatus of claim 8, wherein the color values of the sampled pixels of the screen shared image comprise RGB values.

16. The method of claim 1, wherein the color values of the sampled pixels of the screen shared image comprise RGB values.

* * * * *